US009906693B2

(12) United States Patent
Ohki

(10) Patent No.: US 9,906,693 B2
(45) Date of Patent: Feb. 27, 2018

(54) IMAGE PROCESSING APPARATUS, IMAGE PROCESSING METHOD, AND PROGRAM

(71) Applicant: SONY SEMICONDUCTOR SOLUTIONS CORPORATION, Kanagawa (JP)

(72) Inventor: Mitsuharu Ohki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/312,479

(22) PCT Filed: May 29, 2015

(86) PCT No.: PCT/JP2015/065533
§ 371 (c)(1),
(2) Date: Nov. 18, 2016

(87) PCT Pub. No.: WO2015/190317
PCT Pub. Date: Dec. 17, 2015

(65) Prior Publication Data
US 2017/0104898 A1    Apr. 13, 2017

(30) Foreign Application Priority Data

Jun. 11, 2014  (JP) .................. 2014-120204

(51) Int. Cl.
*H04N 5/217* (2011.01)
*H04N 5/357* (2011.01)
*H04N 5/353* (2011.01)

(52) U.S. Cl.
CPC ......... *H04N 5/2173* (2013.01); *H04N 5/3532* (2013.01); *H04N 5/3572* (2013.01)

(58) Field of Classification Search
CPC .. H04N 5/2329; H04N 5/2173; H04N 5/3572; H04N 5/3532; H04N 5/23254;
(Continued)

(56) References Cited

U.S. PATENT DOCUMENTS 8,345,109 B2 * 1/2013 Takane ............... H04N 5/23248
348/208.12
8,823,813 B2 * 9/2014 Mantzel ............. H04N 5/23248
348/208.6
(Continued)

FOREIGN PATENT DOCUMENTS

CN    102075681        5/2011
CN    102694979 A      9/2012
(Continued)

OTHER PUBLICATIONS

International Search Report and the Written Opinion Received for PCT Application No. PCT/JP2015/065533, dated Aug. 11, 2015, 7 pages of English Translation and 7 pages of ISRWO.
(Continued)

*Primary Examiner* — Pritham Prabhakher
(74) *Attorney, Agent, or Firm* — Chip Law Group

(57) ABSTRACT

The present disclosure relates to an image processing apparatus, an image processing method, and a program that can correct distortion generated in frames caused by a rolling shutter to a degree to which the frames may be viewed. Provided is an image processing apparatus that corrects distortion generated in a frame constituting a moving image, the image processing apparatus including: a first detection unit configured to detect distorted high-frequency components corresponding to high-frequency components of distortion of the frame; a second detection unit configured to detect distorted low-frequency components corresponding to low-frequency components of distortion of the frame; a correction determination unit configured to determine an
(Continued)

amount of correction of the distorted high-frequency components; and a correction unit configured to correct the distorted low-frequency components generated in the frame on the basis of the detected distorted low-frequency components and correct the distorted high-frequency components generated in the frame according to the determined amount of correction. The present disclosure can be applied to, for example, a video camera equipped with a CMOS sensor.

8 Claims, 12 Drawing Sheets

(58) Field of Classification Search
CPC ............ H04N 5/23248; H04N 5/23277; G06T 5/003; G06T 5/50; G06T 2207/10016; G06T 2207/20182; G06T 2207/20201
USPC .......................................................... 348/241
See application file for complete search history.

(56) References Cited

U.S. PATENT DOCUMENTS

| | | | |
|---|---|---|---|
| 8,970,712 B2 | 3/2015 | Narita | |
| 9,124,807 B2* | 9/2015 | Tsubaki | H04N 5/23274 |
| 9,398,219 B2* | 7/2016 | Kenjo | H04N 5/23267 |
| 9,460,495 B2* | 10/2016 | Wu | G06T 5/006 |
| 9,697,587 B2* | 7/2017 | Yuan | H04N 5/23267 |
| 2009/0167911 A1* | 7/2009 | Takane | H04N 5/23248 |
| | | | 348/296 |
| 2011/0122265 A1 | 5/2011 | Oryoji et al. | |
| 2012/0287295 A1* | 11/2012 | Oota | H04N 5/144 |
| | | | 348/208.99 |
| 2013/0044241 A1* | 2/2013 | Zhou | H04N 5/23258 |
| | | | 348/241 |
| 2014/0071299 A1* | 3/2014 | Grundmann | G06T 5/003 |
| | | | 348/207.1 |
| 2014/0078327 A1* | 3/2014 | Miyasako | H04N 5/23258 |
| | | | 348/208.6 |
| 2014/0218569 A1* | 8/2014 | Tsubaki | H04N 5/23274 |
| | | | 348/241 |
| 2015/0085150 A1* | 3/2015 | Silverstein | H04N 5/145 |
| | | | 348/208.6 |

FOREIGN PATENT DOCUMENTS

| | | |
|---|---|---|
| JP | 2011-114407 A | 6/2011 |
| JP | 2011-135462 A | 7/2011 |
| JP | 2012-199802 A | 10/2012 |
| JP | 2012-199803 A | 10/2012 |
| JP | 2014-128016 A | 7/2014 |

OTHER PUBLICATIONS

International Preliminary Report on Patentability, PCT Application No. PCT/JP2015/065533, dated Dec. 15, 2016, 5 pages.

Office Action for JP Patent Application No. 2014-120204, dated Jan. 16, 2017, 2 pages of Office Action and 2 pages of English Translation.

* cited by examiner

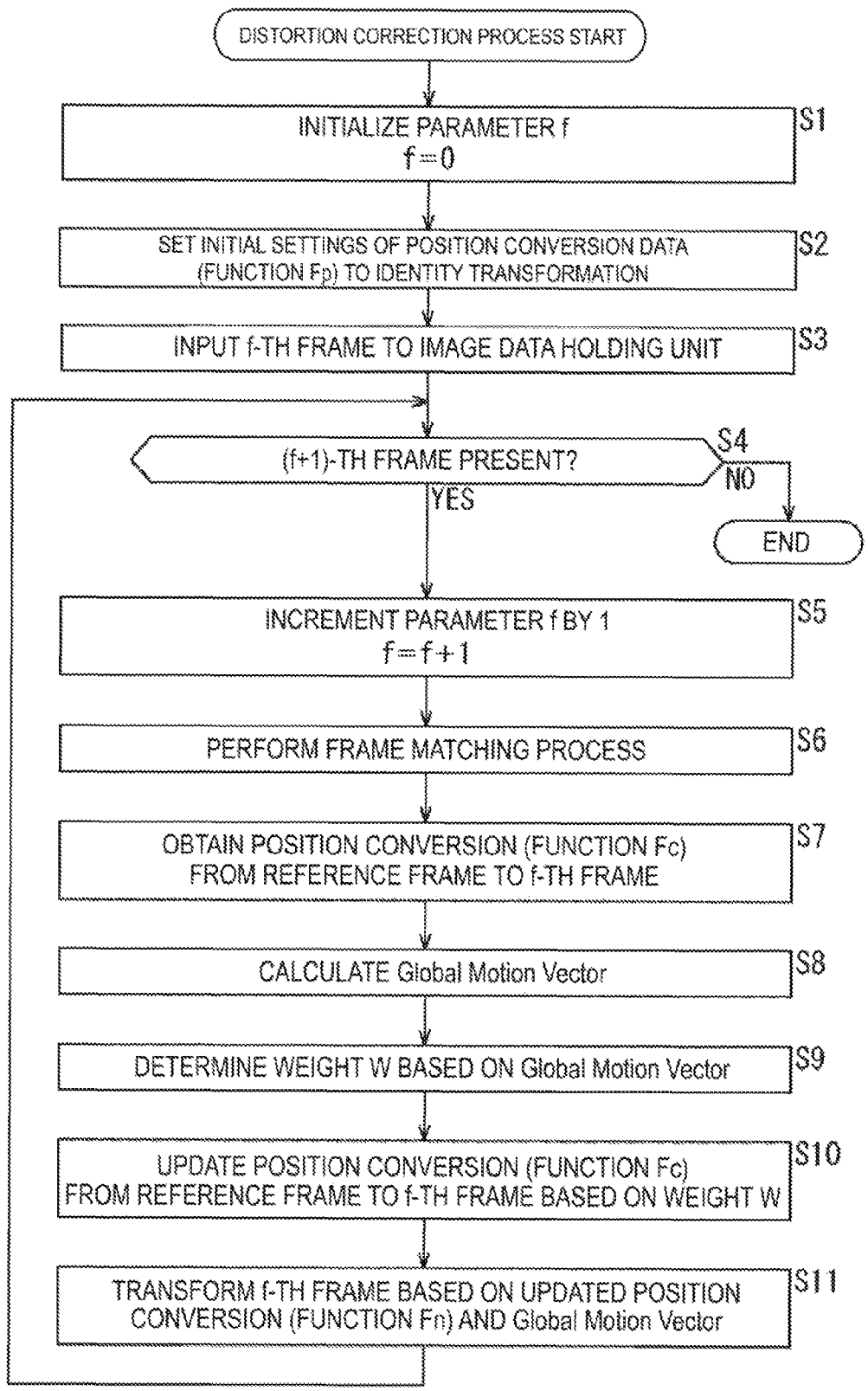

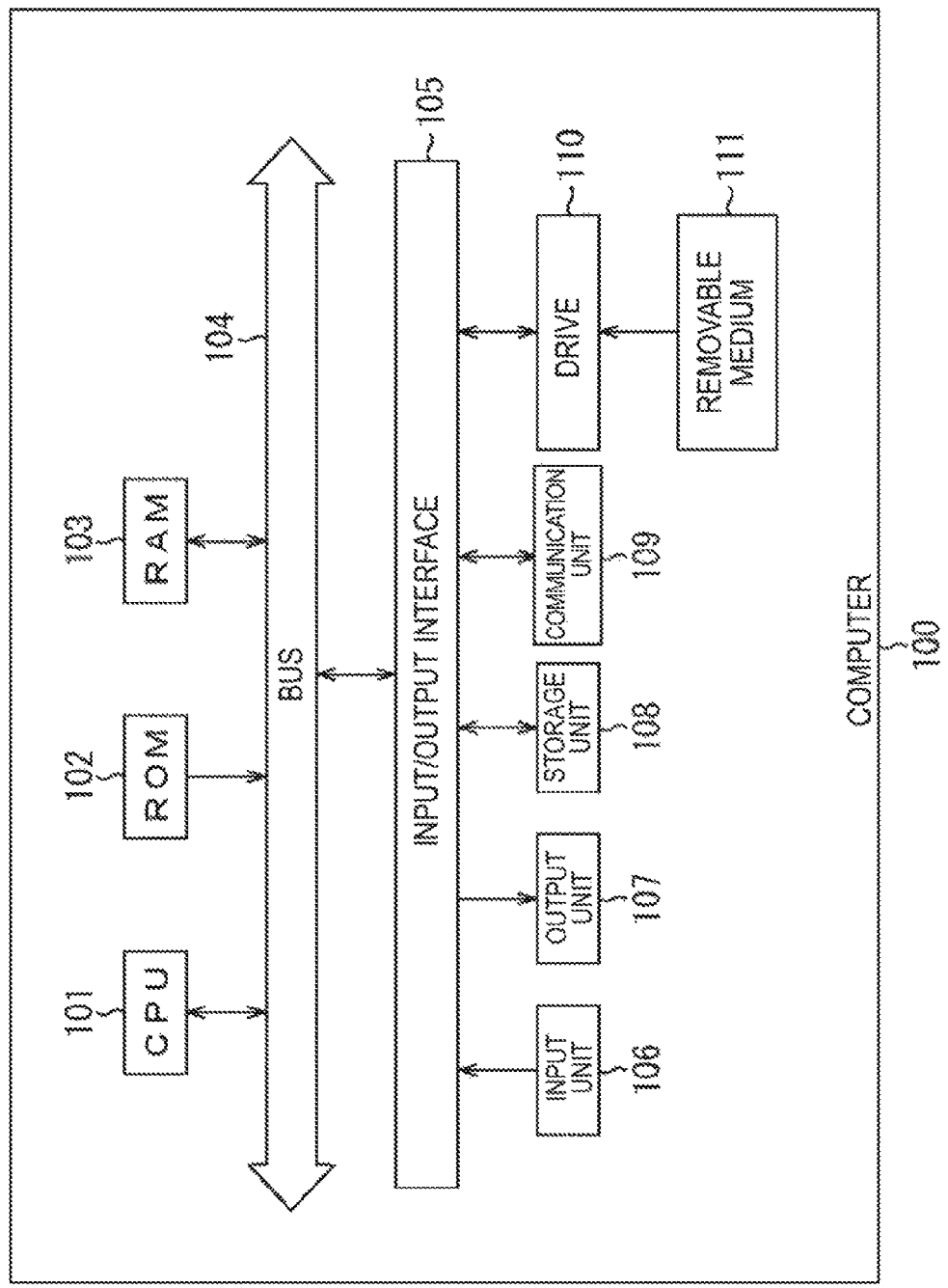

IMAGE PROCESSING APPARATUS, IMAGE PROCESSING METHOD, AND PROGRAM

CROSS REFERENCE TO RELATED APPLICATIONS

This application is a U.S. National Phase of International Patent Application No. PCT/JP2015/065533 filed on May 29, 2015, which claims priority benefit of Japanese Patent Application No. JP 2014-120204 filed in the Japan Patent Office on Jun. 11, 2014. Each of the above-referenced applications is hereby incorporated herein by reference in its entirety.

TECHNICAL FIELD

The present disclosure relates to an image processing apparatus, an image processing method, and a program, and more particularly, to an image processing apparatus, an image processing method and a program suitable to correct focal plane distortion caused by a rolling shutter of a CMOS image sensor.

BACKGROUND ART

Currently, a CMOS image sensor (referred to hereinafter as a CMOS) has become mainstream as an image sensor mounted in a photographing apparatus and the like.

The CMOS cannot simultaneously expose all pixels to light and simultaneously read pixel signals obtained as a result of exposure owing to the structure thereof. Accordingly, a so-called "rolling shutter" sequentially scanning pixels line by line to perform exposure and pixel signal reading is performed. However, there is a CMOS that has a so-called "global shutter function" which may synchronize exposure timing of all pixels.

FIG. 1 is an explanatory diagram of a rolling shutter according to a CMOS and illustrates a 0-th frame f0, a first frame f1, a second frame f2, . . . which are consecutive and constitute a moving image. Each frame includes pixels corresponding to 0-th to (h−1)-th lines.

As described above, exposure and reading are performed line by line according to the rolling shutter. For example, when a frame rate of a photographed moving image is 30 fps, a read timing difference between vertically adjacent lines is $1/(30 \times h)$ seconds. Although $1/(30 \times h)$ seconds are short time, this time may not be ignored when accumulated. Considering two lines of the same frame, which are separated from each other to some degree, for example, it is difficult to regard read timings of the two lines as the same time and the frame is distorted due to a difference between the read timings.

Distortion generated in a frame due to the rolling shutter will be described.

FIG. 2 illustrates a scene (structures such as a house and a building) corresponding to a subject of video shooting. It is assumed that a photographing range of the subject, defined by a broken line, is photographed as a moving image, for example, using a video camera fixed to a vehicle in a stop state with its engine started. Here, the video camera is assumed to micro-vibrate horizontally due to vibration of the engine.

FIG. 3 illustrates one frame of the moving image photographed in a state in which the vehicle is stopped with the video camera micro-vibrating. As illustrated in the figure, horizontal vibration (referred to hereinafter as distorted high-frequency components) caused by micro-vibration of the video camera is generated in the video frame, and thus it is difficult to view the moving image in this state.

Accordingly, methods of correcting such distorted high-frequency components have been established. Specifically, a pixel matching process for specifying positions of the same portion of the captured subject between two frames temporally adjacent to each other (e.g., temporally adjacent (n−1)-th frame and n-th frame) is performed to obtain a corresponding relation between pixels of the two frames and distorted high-frequency components generated in the frames are corrected on the basis of the corresponding relation.

FIG. 4 illustrates a result of distortion correction performed for the frame having the distorted high-frequency components, illustrated in FIG. 3. If a correct corresponding relation between pixels of the two frames may be obtained, the distorted high-frequency components may be corrected as illustrated in FIG. 4. However, as seen from comparison between a viewing angle of the frame before distortion correction illustrated in FIG. 3 and a viewing angle of the frame after distortion correction illustrated in FIG. 4, the viewing angle of the frame after distortion correction is narrowed.

A case in which photographing is performed in a direction perpendicular to a traveling direction of the traveling vehicle (right lateral direction) using the video camera fixed to the vehicle, as mentioned above, is considered.

FIG. 5 illustrates shift of a photographing range when a moving image is photographed during traveling of the vehicle. That is, when the vehicle travels to the right in the figure, the photographing range of the video camera is also moved to the right in the figure, as indicated by broken lines.

FIG. 6 illustrates one frame of the moving image, captured during traveling of the vehicle. As illustrated in the figure, distorted high-frequency components are generated in the video frame as in the case of FIG. 3. Furthermore, distortion (referred to hereinafter as distorted low-frequency components) that a house and a building standing upright are photographed as tilted house and building is generated. This is because there is a difference between timing of photographing the 0-th line of the frame and timing of photographing an m-th line (m being an integer in the range of 1 to h−1) of the frame.

It is difficult to view the moving image having the distorted high-frequency components and the distorted low-frequency components as illustrated in FIG. 6. Accordingly, various methods for such distortion correction have been provided. Specifically, a pixel matching process is performed between two temporally adjacent frames and distortions (distorted high-frequency components and distorted low-frequency components) are collectively corrected on the basis of a corresponding relation between pixels of the two frames, like the aforementioned distorted high-frequency component correction.

FIG. 7 illustrates a result of distortion correction performed for the frame having distorted high-frequency components and distorted low-frequency components, illustrated in FIG. 6. If a correct corresponding relation between pixels of the two frames may be obtained, the distorted high-frequency components and the distorted low-frequency components may be corrected at one time as illustrated in FIG. 7.

However, in the case of the video frame captured during traveling of the vehicle, the viewing angle of the frame after correction of the distorted high-frequency components and the distorted low-frequency components becomes narrower than that of the frame after correction of the distorted high-frequency components, illustrated in FIG. 4, because the photographing range changes as illustrated in FIG. 5.

With respect to the pixel matching process for the moving image photographed in a stop state, illustrated in FIG. 3, a search range may be narrowed since the photographing range of each frame is changed by only a degree corresponding to micro-vibration. Accordingly, it may be possible to relatively easily and accurately detect corresponding pixel positions between two frames.

With respect to the pixel matching process for the moving image photographed in a traveling state, illustrated in FIG. 6, it is necessary to widen a search range because frames have different photographing ranges. This increases the amount of computations and a possibility that corresponding pixel positions between two frames are erroneously detected. If corresponding pixel positions between two frames are erroneously detected and distortion correction is performed on the basis of the corresponding pixel positions, a problem that the moving image becomes a state that is more difficult to view than the state before correction may occur.

Accordingly, as a method for solving the problem, there has been proposed a method of performing distortion correction only when the pixel matching process has high accuracy and performing no distortion correction when the pixel matching process has low accuracy, or decreasing a distortion adjustment value when consecutive frames, captured in a traveling state, are moved in the same direction (refer to Patent Literature 1, for example).

CITATION LIST

Patent Literature

Patent Literature 1: JP 2010-166512A

SUMMARY OF INVENTION

Technical Problem

In the method of Patent Literature 1, distortion correction is not performed when the pixel matching process has low accuracy or a distortion adjustment value is decreased when consecutive frames are moved in the same direction, and thus it may be possible to prevent distortion-corrected frames from being deteriorated more than before correction.

In this case, however, a problem that it is difficult to view the corresponding moving image is not solved because distortion remains in frames.

The present disclosure takes such situation into consideration and may correct distortion generated in frames caused by a rolling shutter to a degree to which the frames may be viewed.

Solution to Problem

An image processing apparatus according to one aspect of the present disclosure is an image processing apparatus that corrects distortion generated in a frame constituting a moving image, the image processing apparatus including: a first detection unit configured to detect distorted high-frequency components corresponding to high-frequency components of distortion of the frame; a second detection unit configured to detect distorted low-frequency components corresponding to low-frequency components of distortion of the frame; a correction determination unit configured to determine an amount of correction of the distorted high-frequency components; and a correction unit configured to correct the distorted low-frequency components generated in the frame on the basis of the detected distorted low-frequency components and correct the distorted high-frequency components generated in the frame according to the determined amount of correction.

The correction determination unit can determine the amount of correction of the distorted high-frequency components on the basis of the magnitude of the detected distorted low-frequency components.

The first detection unit can detect relations between positions of corresponding pixels of temporally adjacent two frames as the distorted high-frequency components according to a pixel matching process between the two frames, and the second detection unit can detect an average of the relations between positions of corresponding pixels of the two frames as the distorted low-frequency components.

The correction determination unit can monotonically decrease the amount of correction of the distorted high-frequency components in response to an increase in the magnitude of the detected distorted low-frequency components.

The image processing apparatus according to one aspect of the present disclosure can further include a weight determination unit configured to determine a weight coefficient on the basis of the magnitude of the detected distorted low-frequency components. The correction determination unit can determine the amount of correction of the distorted high-frequency components on the basis of the determined weight coefficient.

The image processing apparatus according to one aspect of the present disclosure can further include a multiplication unit configured to multiply the amount of correction of the distorted high-frequency components with respect to a frame one frame before the present frame by the detected distorted high-frequency components. The correction determination unit can determine the amount of correction of the distorted high-frequency components further on the basis of a result of multiplication of the amount of correction of the distorted high-frequency components with respect to a frame one frame before the present frame by the detected distorted high-frequency components.

An image processing method according to one aspect of the present disclosure is an image processing method of an image processing apparatus for correcting distortion generated in a frame constituting a moving image, the image processing method including the steps, performed by the image processing apparatus, of: a first detection step of detecting distorted high-frequency components corresponding to high-frequency components of distortion of the frame; a second detection step of detecting distorted low-frequency components corresponding to low-frequency components of distortion of the frame; a correction determination step of determining an amount of correction of the distorted high-frequency components; and a correction step of correcting the distorted low-frequency components generated in the frame on the basis of the detected distorted low-frequency components and correcting the distorted high-frequency components generated in the frame according to the determined amount of correction.

A program according to one aspect of the present disclosure is a program for causing a computer for correcting distortion generated in a frame constituting a moving image to function as: a first detection unit configured to detect distorted high-frequency components corresponding to high-frequency components of distortion of the frame; a second detection unit configured to detect distorted low-frequency components corresponding to low-frequency components of distortion of the frame; a correction determination unit configured to determine an amount of correction of the distorted high-frequency components; and a correction unit configured to correct the distorted low-frequency components generated in the frame on the basis of the detected distorted low-frequency components and correct the distorted high-frequency components generated in the frame according to the determined amount of correction.

In one aspect of the present disclosure, a distorted high-frequency component corresponding to a high-frequency component of distortion of a frame that forms a moving image is detected, a distorted low-frequency component corresponding to a low-frequency component of distortion of the frame is detected, and the amount of correction of the distorted high-frequency component is determined. In addition, the distorted low-frequency component generated in the frame is corrected on the basis of the detected distorted low-frequency component and the distorted high-frequency component generated in the frame is corrected according to the determined amount of correction.

Advantageous Effects of Invention

According to one aspect of the present disclosure, it may be possible to correct distortion generated in frames, caused by a rolling shutter, to a degree to which the frames may be viewed.

BRIEF DESCRIPTION OF DRAWINGS

FIG. 13 is a flowchart illustrating a distortion correction process.

FIG. 14 is a block diagram illustrating an example of a configuration of a computer.

DESCRIPTION OF EMBODIMENT(S)

The overview of the present disclosure will be described prior to detailed description of preferred forms (referred to hereinafter as embodiments) for embodying the present disclosure with reference to the appended drawings.

<Overview of Present Disclosure>

In the present embodiment, a distorted low-frequency component represents a component of a band lower than a frame rate of a moving image, from among distortions generated in frames of the moving image, and a distorted high-frequency component represents a component of a band higher than the frame rate of the moving image.

In general, it is known that human visual characteristics may recognize a minute change in a moving image with an invariant photographing range, which is captured in a stop state, when viewing the moving image and may recognize a large change in a moving image with a variable photographing range, which is captured during movement, although may not recognize a minute change in the moving image.

Figure 1:
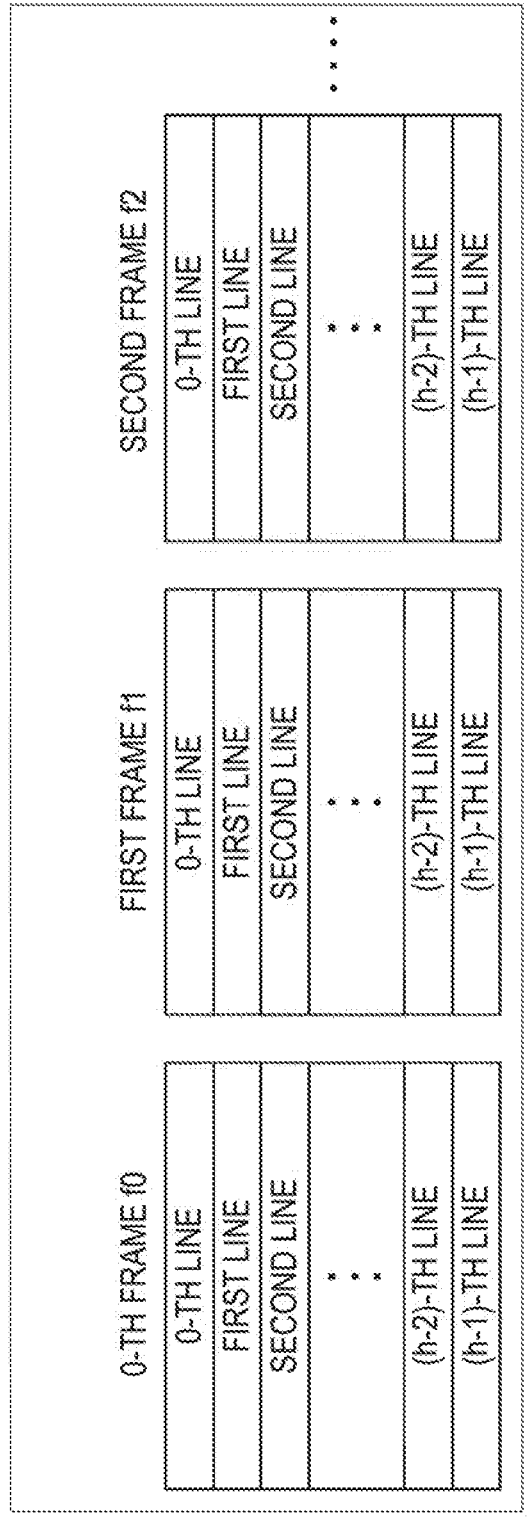
FIG. 1 is an explanatory diagram of a rolling shutter according to a CMOS.
Figure 2:
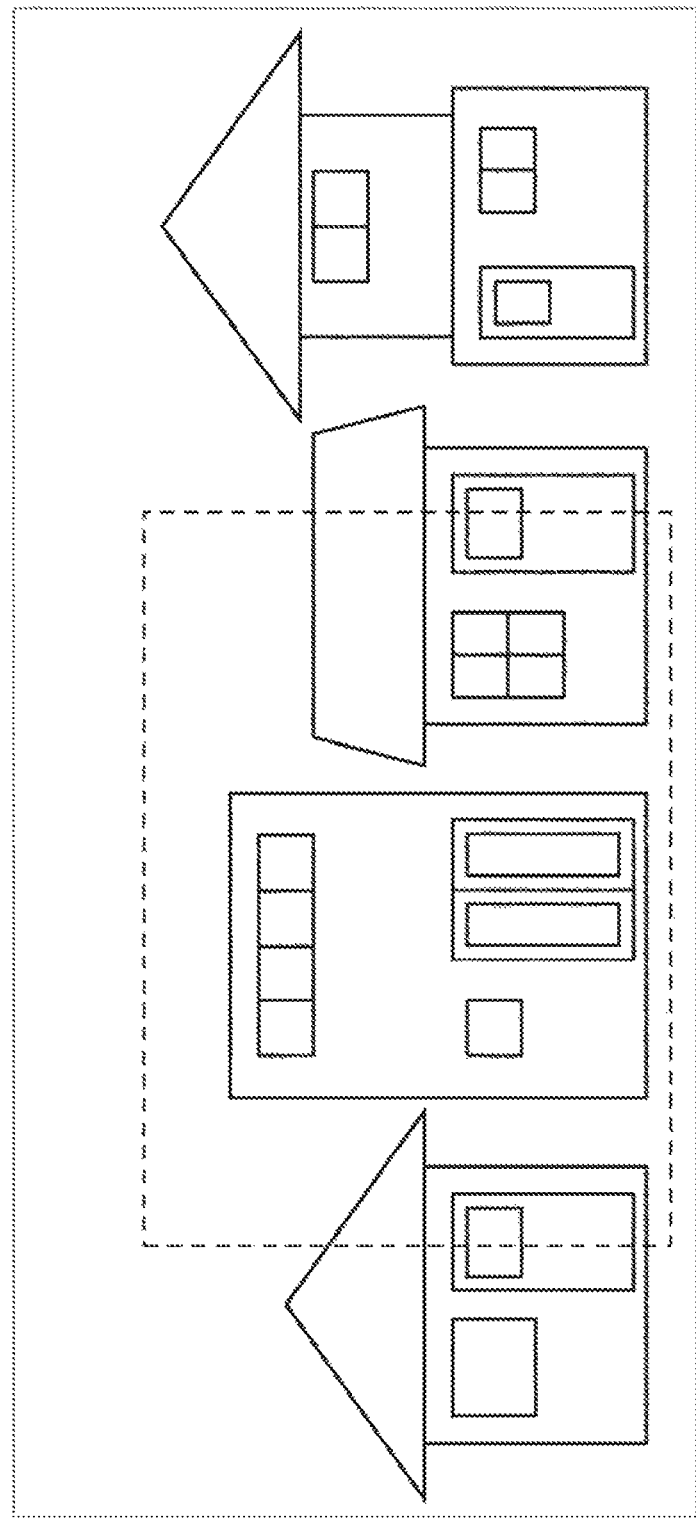
FIG. 2 is a diagram illustrating a photographing range in a stop state.
Figure 3:
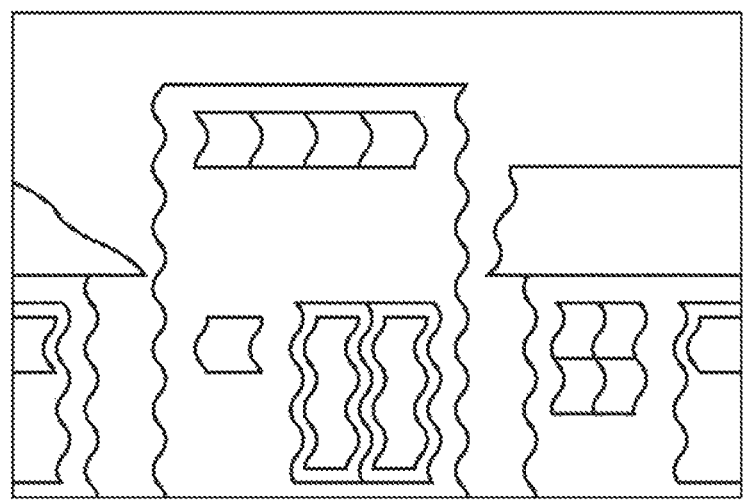
FIG. 3 is a diagram illustrating a video frame captured in a stop state with micro-vibration.
Figure 4:
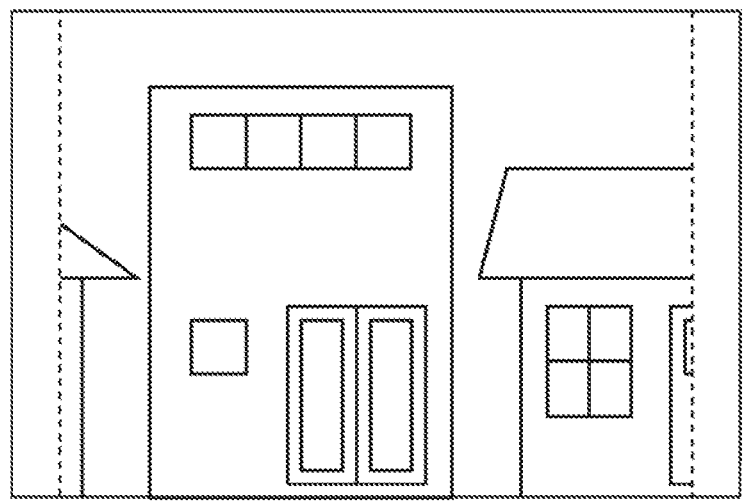
FIG. 4 is a diagram illustrating a result of correction of the frame of FIG. 3.
Figure 5:
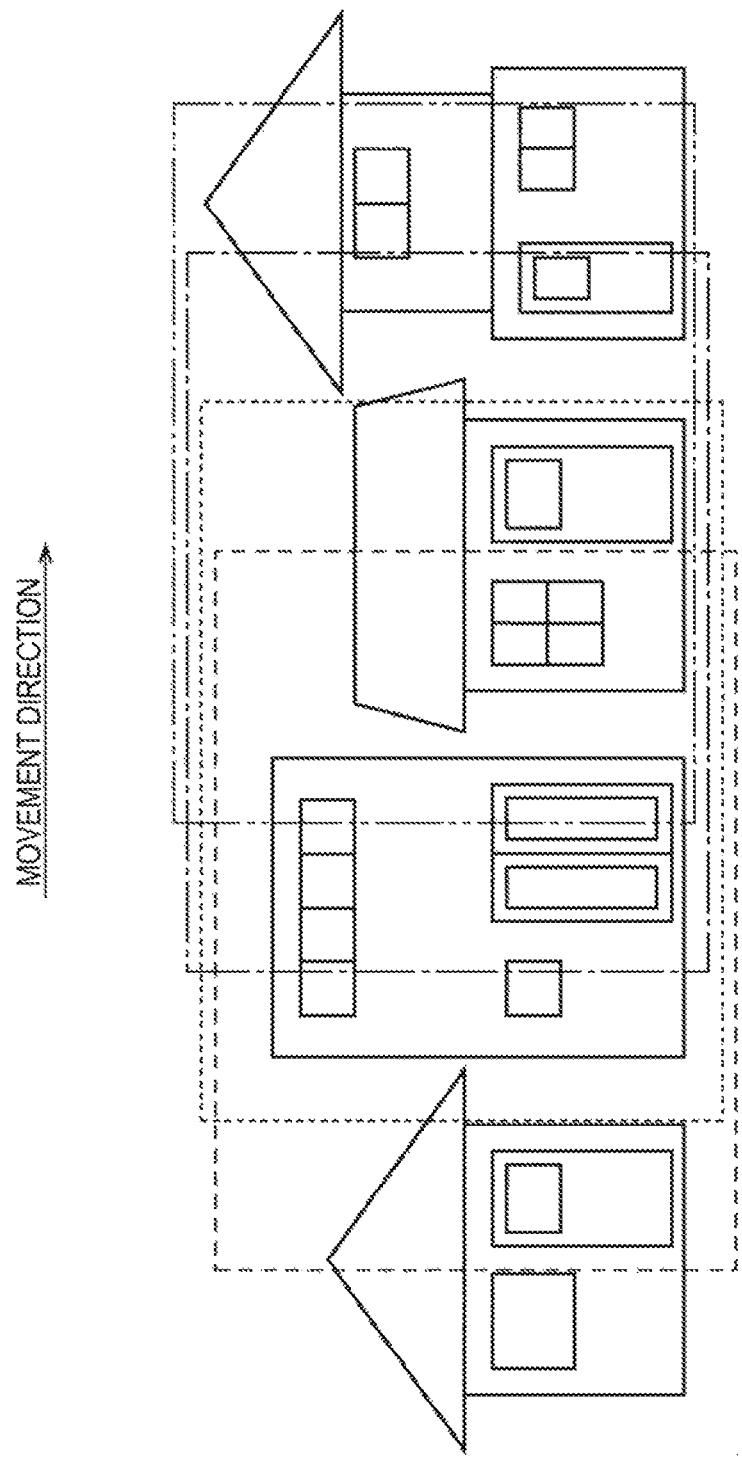
FIG. 5 is a diagram illustrating a photographing range in a traveling state.

Specifically, when a moving image including a frame as illustrated in FIG. 3 is viewed, for example, distorted high-frequency components generated in the frame may be recognized. Accordingly, it is difficult to view the moving image in this state and thus it is desirable to correct the distorted high-frequency components.

Figure 6:
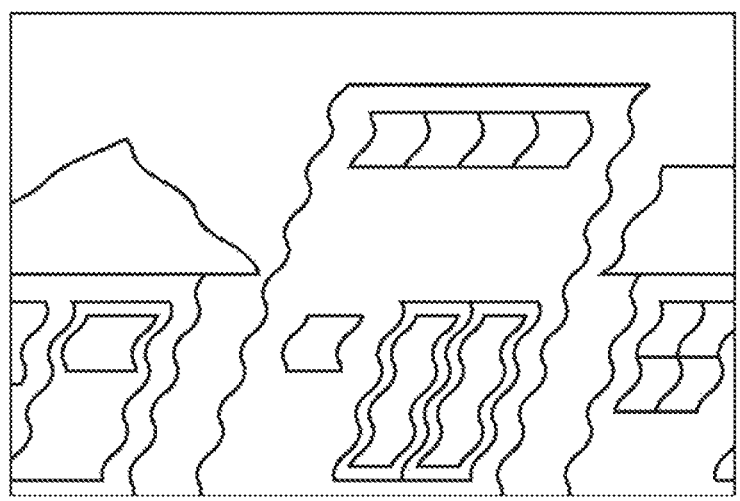
FIG. 6 is a diagram illustrating a video frame captured in a traveling state.
Figure 7:
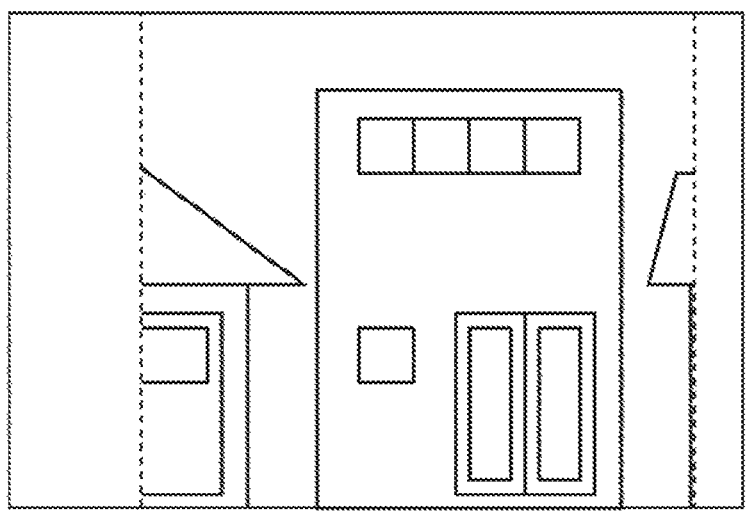
FIG. 7 is a diagram illustrating a result of correction of the frame of FIG. 6.

When a moving image including a frame as illustrated in FIG. 6 is viewed, distorted low-frequency components (inclination of a subject standing upright) generated in the frame may be recognized, whereas distorted high-frequency components may not be recognized. In this case, accordingly, the moving image may be viewed if only the distorted low-frequency components are corrected.

Therefore, in an image processing apparatus according to the present embodiment, only distorted low-frequency components are corrected and distorted high-frequency components are hardly corrected when the distorted low-frequency components are large. When the distorted low-frequency components are large, the distorted low-frequency components and the distorted high-frequency components are corrected.

Figure 8:
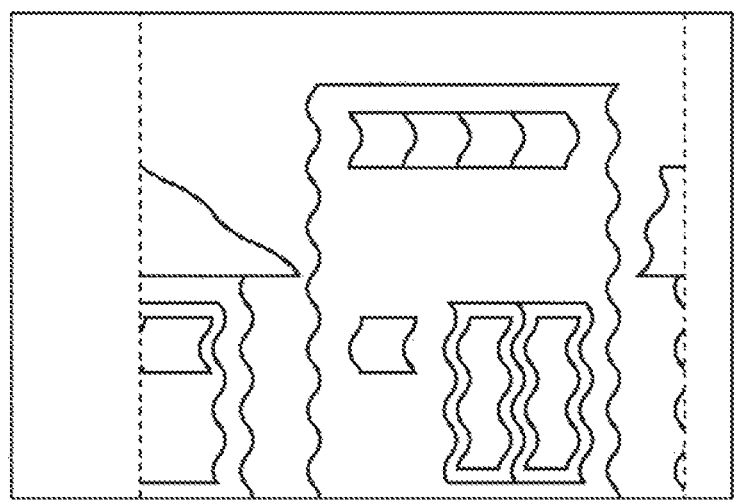
FIG. 8 is an explanatory diagram illustrating the overview of the present disclosure.

FIG. 8 illustrates a result of distortion correction of the video frame which is captured during traveling and has distorted low-frequency components and distorted high-frequency components generated therein, illustrated in FIG. 6, through the image processing apparatus according to the present embodiment.

As illustrated in this figure, when distortion is corrected through the image processing apparatus according to an embodiment of the present disclosure, there is no problem in viewing the moving image although distorted high-frequency components remain in the frame.

<Example of Configuration of Image Processing Apparatus According to Present Embodiment>

Figure 9:
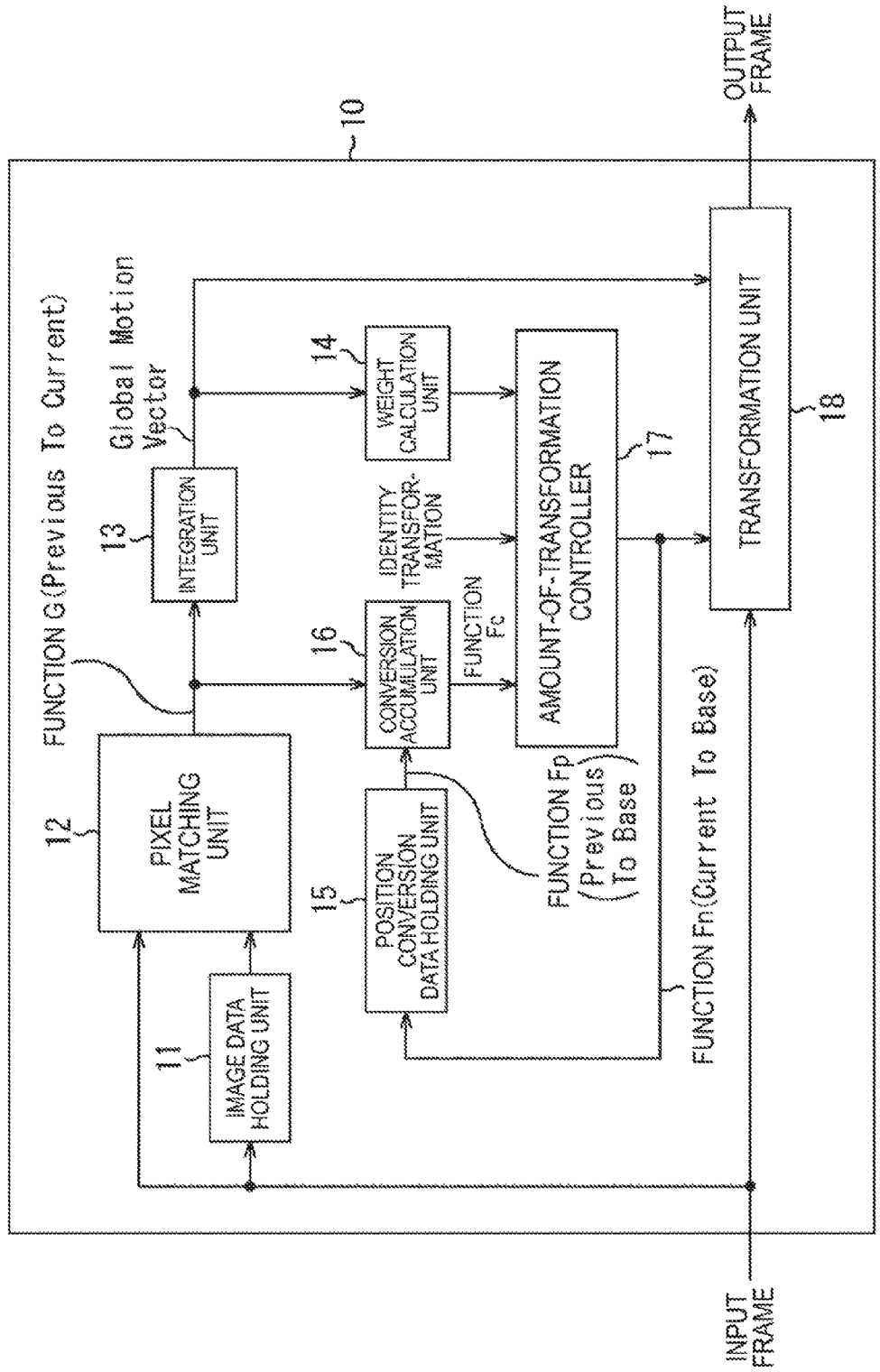
FIG. 9 is a block diagram illustrating an example of a configuration of an image processing apparatus to which the present disclosure is applied.

FIG. 9 illustrates an example of a configuration of the image processing apparatus according to the present embodiment.

The image processing apparatus 10 includes an image data holding unit 11, a pixel matching unit 12, an integration unit 13, a weight calculation unit 14, a position conversion data holding unit 15, a conversion accumulation unit 16, an amount-of-transformation controller 17 and a transformation unit 18.

Frames constituting a moving image are sequentially applied to the image processing apparatus 10 and input to the image data holding unit 11, the pixel matching unit 12 and the transformation unit 18. The simultaneously input frames are regarded as f-th frames.

The image data holding unit 11 delays the video frames sequentially input to the image processing apparatus 10 by one frame period and outputs the delayed video frames to the following pixel matching unit 12.

The pixel matching unit 12 performs a pixel matching process for temporally adjacent two frames of an (f−1)-th frame and an f-th frame which are simultaneously input, as processing targets and specifies a position of a pixel of the f-th frame, which corresponds to each pixel of the (f−1)-th frame.

Here, when coordinates of each pixel of the (f−1)-th frame are $(x_p, y_p)$ and coordinates of a pixel of the f-th frame, which corresponds each pixel of the (f−1)-th frame, are $(x_c, y_c)$, a relation between positions of each pixel of the (f−1)-th frame and a pixel of the f-th frame, which corresponds to each pixel of the (f−1)-th frame, may be represented by a function G as expressed by the following equation (1). In other words, the function G may project the coordinates $(x_p, y_p)$ to the coordinates $(x_c, y_c)$.

[Math. 1]

$$(x_c, y_c) = G(x_p, y_p) \tag{1}$$

As a method for obtaining the function G according to the pixel matching process, for example, the method disclosed in "B. K. P. Horn and B. G. Schunck, "Determining optical flow", AI Memo 572, Massachusetts Institute of Technology, 1980" may be applied. Furthermore, other existing methods may be applied.

The pixel matching unit 12 outputs the obtained function G (described as "previous to current" in FIG. 9) to the integration unit 13 and the conversion accumulation unit 16.

The integration unit 13 calculates an average $(x_{gmv}, y_{gmv})$ of amounts of movement from the (f−1)-th frame to the f-th frame using the following equation (2) on the basis of the function G that represents the relation between the positions of each pixel of the (f−1)-th frame and a pixel of the f-th frame, which corresponds to each pixel of the (f−1)-th frame. In the equation (2), NumOfPixels refers to a total number of pixels in a frame.

[Math. 2]

$$(x_{gmv}, y_{gmv}) = \frac{\sum_{(x_p, y_p)} \{G(x_p, y_p) - (x_p, y_p)\}}{NumOfPixels} \tag{2}$$

Hereinafter, the average $(x_{gmv}, y_{gmv})$ of amounts of movement from the (f−1)-th frame to the f-th frame is referred to as a global motion vector.

Although there is a possibility that the function G output from the pixel matching unit 12 is not correct, random noise (incorrectness of the function G) may be removed through integration in the integration unit 13. Consequently, the global motion vector may be considered to be correct.

The integration unit 13 outputs the calculated global motion vector to the weight calculation unit 14 and the transformation unit 18.

The weight calculation unit 14 determines a weight coefficient W that decides an amount of correction of minute variations (distorted high-frequency components) generated in frames on the basis of the global motion vector input thereto.

Figure 10:
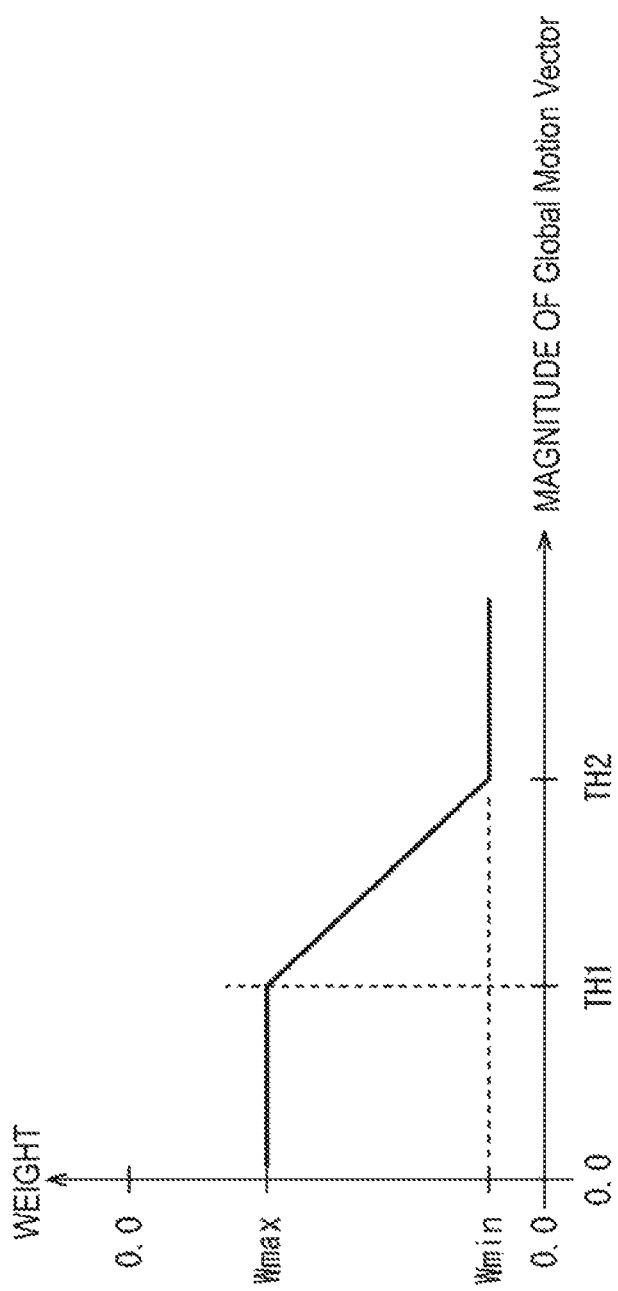
FIG. 10 is a diagram illustrating a relationship between a global motion vector and a weight coefficient.

FIG. 10 illustrates a relationship between the global motion vector and the weight coefficient. In the figure, the horizontal axis indicates the magnitude of the global motion vector and the vertical axis represents the weight coefficient. Threshold values TH1 and TH2 of the global motion vector of the horizontal axis and a maximum value Wmax and a minimum value Wmin of the weight coefficient of the vertical axis are predetermined values, for example, TH1=20 pixels, TH2=60 pixels, Wmax=0.7 and Wmin=0.1.

In this case, if the magnitude of the global motion vector is 20 or less according to pixel conversion, this represents that 70% of distorted high-frequency components generated in frames have been corrected. If the magnitude of the global motion vector is 60 or more according to pixel conversion, this represents that only 10% of distorted high-frequency components generated in frames have been corrected.

Referring back to FIG. 9, the position conversion data holding unit 15 delays a function Fn input from the amount-of-transformation controller 17 by one frame period and outputs the delayed function to the conversion accumulation unit 16 as a function Fp. However, when the currently observed f-th frame is the 0-th frame, the function Fp is not present and thus the position conversion data holding unit 15 outputs identity transformation I corresponding to initial settings, instead of the function Fp.

The conversion accumulation unit 16 multiplies the function G input from the pixel matching unit 12 by the function Fp input from the position conversion data holding unit 15 to produce a function Fc according to the following equation (3) and outputs the function Fc to the amount-of-transformation controller 17.

[Math. 3]

$$F_c = G \cdot F_p \tag{3}$$

Here, the function G represents the relation between the positions of each pixel of the (f−1)-th frame and the corresponding pixel of the f-th frame and the function Fp represents a relation between positions of each pixel of a reference frame preceding the currently observed f-th frame and a pixel of the (f−1)-th frame, which corresponds to each pixel of the reference frame.

Accordingly, the function Fc indicates a relation between positions of each pixel of the reference frame and a pixel of the f-th frame, which corresponds to each pixel of the reference frame, and represents a positional relation when minute variations generated in the f-th frame is completely corrected.

The amount-of-transformation controller 17 calculates a function Fn according to the following equation (4) on the basis of the function Fc input from the conversion accumulation unit 16 and the weight coefficient W input from the weight calculation unit 14 and outputs the function Fn to the position conversion data holding unit 15 and the transformation unit 18. In equation (4), I represents identity transformation.

[Math. 4]

$$F_n = W \times F_c + (1-W) \times I \tag{4}$$

As is apparent by the equation (4), the function Fn approximates the function Fc when the weight coefficient W is a large value. In this case, minute variations generated in the f-th frame are completely corrected in the transformation unit 18. When the weight coefficient W is a small value, the function Fn approximates the identify transformation I. In this case, transformation (distortion correction) is hardly performed in the transformation unit 18.

The transformation unit 18 corrects minute variations (distorted high-frequency components) generated in the f-th frame, having the f-th frame as a processing target, on the basis of the function Fn input from the amount-of-transformation controller 17. In addition, the transformation unit 18 corrects inclination of the subject (distorted low-frequency components) in a specific direction, which is generated in the f-th frame, on the basis of the global motion vector input from the integration unit 13.

Specifically, correction of distorted high-frequency components based on the function Fn is performed in such a manner that a pixel value of a pixel of the f-th frame, which is positioned at coordinates indicated by the function Fn ($x_b$, $y_b$), is written into coordinates ($x_b$, $y_b$).

Correction of distorted low-frequency components based on the global motion vector is performed in such a manner that a pixel value of a pixel positioned at coordinates indicated by a function H ($x_i$, $y_i$) is written into coordinates ($x_i$, $y_i$). Here, the function H is represented by the following equation (5).

[Math. 5]

$$H(x_i, y_i) = \left(x_i + \frac{x_{gmv} \times y_i}{h}, \frac{(h + y_{gmv}) \times y_i}{h}\right) \quad (5)$$

Correction of distorted high-frequency components and distorted low-frequency components according to the transformation unit 18 may be expressed by the following equation (6).

[Math. 6]

$$(x_0, y_0) = H \cdot F_n(x_b, y_b) \quad (6)$$

That is, the transformation unit 18 writes a pixel value of a pixel of the f-th frame, which is positioned at coordinates ($x_0$, $y_0$), into coordinates ($x_b$, $y_b$). In this manner, the f-th frame may be corrected by writing pixel values into all coordinates ($x_b$, $y_b$).

Here, the function H used to correct distorted low-frequency components on the basis of the global motion vector is described.

Figure 11:
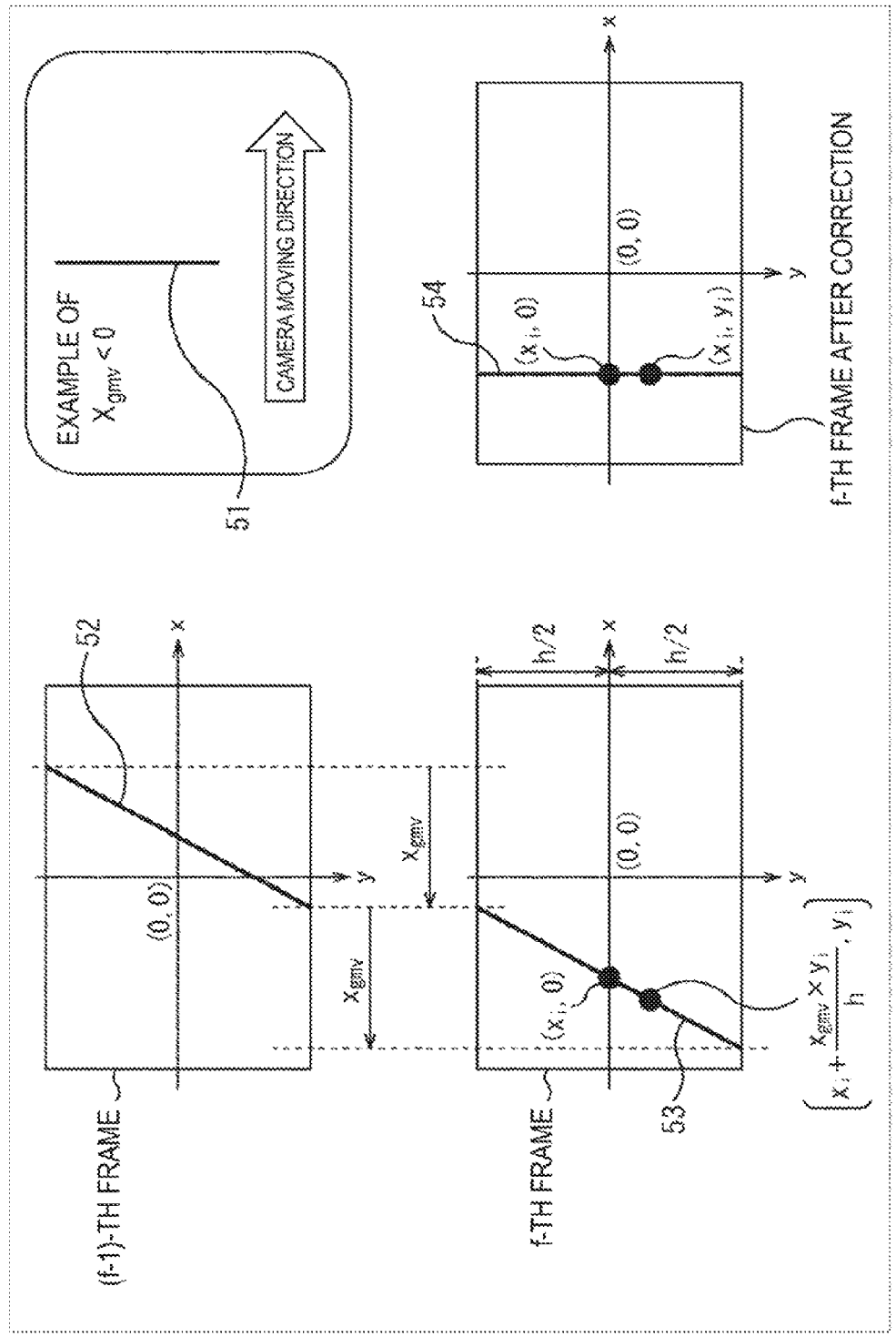
FIG. 11 is an explanatory diagram of a function H used to correct a distorted low-frequency component.

FIG. 11 illustrates the (f−1)-th frame and the f-th frame when a straight rod-shaped subject in a still state is photographed as a moving image with a video camera horizontally moving from the left to the right in the figure. It is assumed that the subject 51 in a still state stands upright.

In this case, the subject 51 standing upright is projected to the (f−1)-th frame as an inclined projection image 52. Similarly, the subject 51 standing upright is projected to the f-th frame as an inclined projection image 53.

A global motion vector ($x_{gmv}$, $y_{gmv}$) is obtained from the two frames, where $x_{gmv}<0$ and $y_{gmv}=0$. The magnitude of $x_{gmv}$ corresponds to the amount of deviation in the x-direction from 0-th to (h−1)-th lines of the projection image 52 (or the projection image 53). Accordingly, correction of transforming the f-th frame illustrated in the figure into a corrected f-th frame corresponds to the function H.

Figure 12:
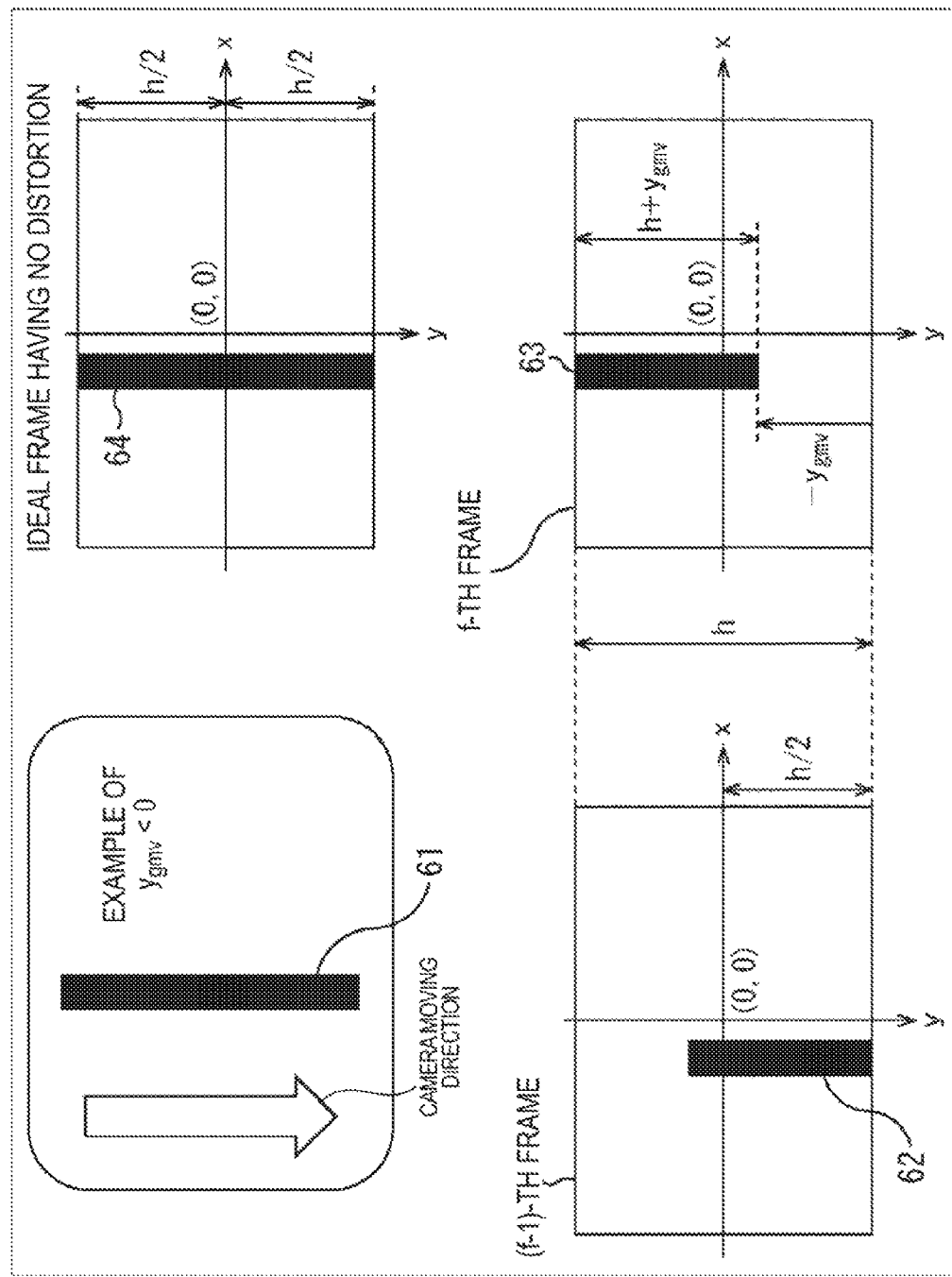
FIG. 12 is an explanatory diagram of a function H used to correct a distorted low-frequency component.

FIG. 12 illustrates the (f−1)-th frame and the f-th frame when a straight rod-shaped subject in a still state is photographed as a moving image with a video camera vertically moving from top to down in the figure. It is assumed that the subject 61 in a still state stands upright.

In this case, the straight rod-shaped subject 61 is projected as a projection image 62 or 63 shorter than the real subject to the (f−1)-th frame or the f-th frame.

A global motion vector ($x_{gmv}$, $y_{gmv}$) is obtained from the two frames, where $x_{gmv}=0$ and $y_{gmv}<0$. The magnitude of $y_{gmv}$ corresponds to the amount of deviation in the y-direction in the projection images 62 and 63, as illustrated in the figure. Accordingly, correction of transforming (expanding or reducing) the projection image 63 having a length of (h+$y_{gmv}$) in the f-th frame into a subject 64 in an ideal frame having no distortion corresponds to the function H.

<Operation of Image Processing Apparatus 10>

A distortion correction process in the image processing apparatus 10 will be described. FIG. 13 is a flowchart illustrating the distortion correction process in the image processing apparatus 10.

With respect to the distortion correction process, it is assumed that frames constituting a moving image are sequentially input to the image processing apparatus 10 at a predetermined frame rate in step S3 and subsequent steps therefrom, which will be described below.

In step S1, a parameter f that indicates the number of a frame corresponding to a processing target, which is input to the image processing apparatus 10, is reset to 0. In step S2, the position conversion data holding unit 15 sets position conversion data (the function Fp) output to the conversion accumulation unit 16 to identity transformation I because the function Fn is not currently input from the amount-of-transformation controller 17.

In step S3, the f-th (0-th in this case) frame is input to the image data holding unit 11. The image data holding unit 11 holds the f-th frame for one frame period and outputs the f-th frame along with the next frame to the pixel matching unit 12 at the timing of input of the next frame to the image processing apparatus 10.

In step S4, it is determined whether a frame (i.e., (f+1)-th frame) following the f-th frame is present, and the process goes to step S5 when the frame is present. If the frame is not present, the distortion correction process is terminated.

In step S5, the parameter f is incremented by 1. In step S6, the f-th (first in this case) frame is input to (the image data holding unit 11, the pixel matching unit 12 and the transformation unit 18 of) the image processing apparatus 10. Accordingly, the present f-th frame and the (f−1)-th frame are input to the pixel matching unit 12 and a pixel matching process between the two frames is performed. The function G obtained as a result of the pixel matching process is input to the integration unit 13 and the conversion accumulation unit 16.

In step S7, the conversion accumulation unit 16 multiplies the function G from the pixel matching unit 12 by the function Fp held in the position conversion data holding unit 15 (the function Fp corresponds to identify transformation I when one frame is a processing target) according to the equation (3) and outputs the function Fc obtained as a multiplication result to the amount-of-transformation controller 17.

In step S8, the integration unit 13 calculates a global motion vector according to the equation (2) on the basis of the function G and outputs the global motion vector to the weight calculation unit 14 and the transformation unit 18. The weight calculation unit 14 determines a weight coefficient W on the basis of the global motion vector in step S9.

The process of step S7 and processes of steps S8 and S9 are actually performed in parallel.

In step S10, the amount-of-transformation controller 17 calculates the function Fn according to the equation (4) on the basis of the function Fc from the conversion accumulation unit 16 and the weight coefficient W from the weight calculation unit 14 to update the function Fn obtained for the frame one frame before the present frame and outputs the updated function Fn to the position conversion data holding unit 15 and the transformation unit 18.

In step S11, the transformation unit 18 corrects minute variations (distorted high-frequency components) generated in the f-th frame on the basis of the function Fn from the amount-of-transformation controller 17 and corrects inclination (distorted low-frequency components) of a subject in a specific direction, which is generated in the f-th frame according to the function H based on the global motion vector from the integration unit 13.

According to the above-mentioned process, distortion generated in the f-th frame corresponding to the processing target is corrected. Thereafter, the process returns to step S4, steps S4 to S11 are repeated and the distortion correction process is terminated when no more video frame is input to the image processing apparatus 10.

As described above, according to the image processing apparatus 10 of the present embodiment, distortion caused by a CMOS rolling shutter is classified into distorted high-frequency components and distorted low-frequency components and a degree of correction of the distorted high-frequency components is adjusted in response to the magnitude of the distorted low-frequency components (the magnitude of the global motion vector), and thus obtrusive distortion may be corrected when the moving image is viewed.

The image processing apparatus 10 according to the present embodiment may be applied to, for example, electronic apparatuses equipped with a CMOS, such as a digital video camera, in addition to image processing apparatuses for correcting images.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 14 is a block diagram showing a hardware configuration example of a computer that performs the above-described series of processing using a program.

In the computer 100, a CPU 101, a ROM 102 and a RAM 103 are mutually connected by a bus 104.

An input/output interface 105 is also connected to the bus 104. An input unit 106, an output unit 107, a storage unit 108, a communication unit 110, and a drive 110 are connected to the input/output interface 105.

The input unit 106 is configured from a keyboard, a mouse, a microphone or the like. The output unit 107 is configured from a display, a speaker or the like. The storage unit 108 is configured from a hard disk, a non-volatile memory or the like. The communication unit 109 is configured from a network interface or the like. The drive 110 drives a removable medium 111 such as a magnetic disk, an optical disk, a magneto-optical disk, a semiconductor memory or the like.

In the computer 100 configured as described above, the CPU 101 loads a program that is stored, for example, in the storage unit 108 onto the RAM 103 via the input/output interface 105 and the bus 104, and executes the program. Thus, the above-described series of processing is performed.

Programs to be executed by the computer 100 (the CPU 101) are provided being recorded in the removable medium 111 which is a packaged medium or the like. Also, programs may be provided via a wired or wireless transmission medium, such as a local area network, the Internet or digital satellite broadcasting.

Note that the program executed by the computer may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

Additionally, the present technology may also be configured as below.

(1)

An image processing apparatus that corrects distortion generated in a frame constituting a moving image, the image processing apparatus including:

a first detection unit configured to detect distorted high-frequency components corresponding to high-frequency components of distortion of the frame;

a second detection unit configured to detect distorted low-frequency components corresponding to low-frequency components of distortion of the frame;

a correction determination unit configured to determine an amount of correction of the distorted high-frequency components; and a correction unit configured to correct the distorted low-frequency components generated in the frame on the basis of the detected distorted low-frequency components and correct the distorted high-frequency components generated in the frame according to the determined amount of correction.

(2)

The image processing apparatus according to (1), wherein the correction determination unit determines the amount of correction of the distorted high-frequency components on the basis of the magnitude of the detected distorted low-frequency components.

(3)

The image processing apparatus according to (1) or (2), wherein the first detection unit detects relations between positions of corresponding pixels of temporally adjacent two frames as the distorted high-frequency components according to a pixel matching process between the two frames, and the second detection unit detects an average of the relations between positions of corresponding pixels of the two frames as the distorted low-frequency components.

(4)

The image processing apparatus according to any of (1) to (3), wherein the correction determination unit monotonically decreases the amount of correction of the distorted high-frequency components in response to an increase in the magnitude of the detected distorted low-frequency components.

(5)

The image processing apparatus according to any of (1) to (4), further including a weight determination unit configured to determine a weight coefficient on the basis of the magnitude of the detected distorted low-frequency components, wherein the correction determination unit determines the amount of correction of the distorted high-frequency components on the basis of the determined weight coefficient.

(6)

The image processing apparatus according to any of (1) to (5), further including a multiplication unit configured to multiply the amount of correction of the distorted high-frequency components with respect to a frame one frame before the present frame by the detected distorted high-frequency components, wherein the correction determination unit determines the amount of correction of the distorted high-frequency components further on the basis of a result of multiplication of the amount of correction of the distorted high-frequency components with respect to a frame one frame before the present frame by the detected distorted high-frequency components.

(7) An image processing method of an image processing apparatus for correcting distortion generated in a frame constituting a moving image, the image processing method including the steps, performed by the image processing apparatus, of:
a first detection step of detecting distorted high-frequency components corresponding to high-frequency components of distortion of the frame;
a second detection step of detecting distorted low-frequency components corresponding to low-frequency components of distortion of the frame;
a correction determination step of determining an amount of correction of the distorted high-frequency components; and
a correction step of correcting the distorted low-frequency components generated in the frame on the basis of the detected distorted low-frequency components and correcting the distorted high-frequency components generated in the frame according to the determined amount of correction.

(8) A program for causing a computer for correcting distortion generated in a frame constituting a moving image to function as:
a first detection unit configured to detect distorted high-frequency components corresponding to high-frequency components of distortion of the frame;
a second detection unit configured to detect distorted low-frequency components corresponding to low-frequency components of distortion of the frame;
a correction determination unit configured to determine an amount of correction of the distorted high-frequency components; and
a correction unit configured to correct the distorted low-frequency components generated in the frame on the basis of the detected distorted low-frequency components and correct the distorted high-frequency components generated in the frame according to the determined amount of correction.

REFERENCE SIGNS LIST 10 image processing apparatus
11 image data holding unit
12 pixel matching unit
13 integration unit
14 weight calculation unit
15 position conversion data storage unit
16 conversion accumulation unit
17 amount-of-transformation controller
18 transformation unit

The invention claimed is:

1. An image processing apparatus that corrects distortion generated in a frame constituting a moving image, the image processing apparatus comprising:
a first detection unit configured to detect distorted high-frequency components corresponding to high-frequency components of distortion of the frame;
a second detection unit configured to detect distorted low-frequency components corresponding to low-frequency components of distortion of the frame;
a correction determination unit configured to determine an amount of correction of the distorted high-frequency components; and
a correction unit configured to correct the distorted low-frequency components generated in the frame based on the detected distorted low-frequency components and correct the distorted high-frequency components generated in the frame based on the determined amount of correction.

2. The image processing apparatus according to claim 1, wherein the correction determination unit is further configured to determine the amount of correction of the distorted high-frequency components based on the magnitude of the detected distorted low-frequency components.

3. The image processing apparatus according to claim 2, wherein the first detection unit is further configured to detect relations between positions of corresponding pixels of temporally adjacent two frames as the distorted high-frequency components based on a pixel matching process between the two frames, and
the second detection unit detects an average of the relations between positions of corresponding pixels of the two frames as the distorted low-frequency components.

4. The image processing apparatus according to claim 2, wherein the correction determination unit monotonically decreases the amount of correction of the distorted high-frequency components based on an increase in the magnitude of the detected distorted low-frequency components.

5. The image processing apparatus according to claim 2, further comprising a weight determination unit configured to determine a weight coefficient on the basis of the magnitude of the detected distorted low-frequency components,
wherein the correction determination unit determines the amount of correction of the distorted high-frequency components on the basis of the determined weight coefficient.

6. The image processing apparatus according to claim 2, further comprising a multiplication unit configured to multiply the amount of correction of the distorted high-frequency components with respect to a frame one frame before the present frame by the detected distorted high-frequency components,
wherein the correction determination unit determines the amount of correction of the distorted high-frequency components further on the basis of a result of multiplication of the amount of correction of the distorted high-frequency components with respect to a frame one frame before the present frame by the detected distorted high-frequency components.

7. An image processing method of an image processing apparatus for correcting distortion generated in a frame constituting a moving image, the image processing method comprising the steps of:
detecting distorted high-frequency components corresponding to high-frequency components of distortion of the frame;
detecting distorted low-frequency components corresponding to low-frequency components of distortion of the frame;
determining an amount of correction of the distorted high-frequency components; and
correcting the distorted low-frequency components generated in the frame based on the detected distorted low-frequency components and correcting the distorted high-frequency components generated in the frame based on the determined amount of correction.

8. A non-transitory computer-readable storage medium storing a program for causing a computer for correcting distortion generated in a frame constituting a moving image to function as:

a first detection unit configured to detect distorted high-frequency components corresponding to high-frequency components of distortion of the frame;

a second detection unit configured to detect distorted low-frequency components corresponding to low-frequency components of distortion of the frame;

a correction determination unit configured to determine an amount of correction of the distorted high-frequency components; and a correction unit configured to correct the distorted low-frequency components generated in the frame based on the detected distorted low-frequency components and correct the distorted high-frequency components generated in the frame based on the determined amount of correction.

* * * * *